(12) United States Patent
Bogin et al.

(10) Patent No.: US 6,499,085 B2
(45) Date of Patent: Dec. 24, 2002

(54) METHOD AND SYSTEM FOR SERVICING CACHE LINE IN RESPONSE TO PARTIAL CACHE LINE REQUEST

(75) Inventors: Zohar Bogin, Folsom, CA (US); David J. Harriman, Portland, OR (US); Zdzislaw A. Wirkus, Folsom, CA (US); Satish Acharya, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 138 days.

(21) Appl. No.: 09/752,846

(22) Filed: Dec. 29, 2000

(65) Prior Publication Data

US 2002/0087801 A1 Jul. 4, 2002

(51) Int. Cl.[7] .............................................. G06F 12/00
(52) U.S. Cl. ....................................... 711/118; 711/129
(58) Field of Search ................................. 711/118, 129

(56) References Cited

U.S. PATENT DOCUMENTS 5,845,101 A * 12/1998 Johnson et al. ............. 711/125
6,138,213 A * 10/2000 McMinn ...................... 711/118
6,367,006 B1 * 4/2002 Tran ............................ 712/244

* cited by examiner

Primary Examiner—Jack A. Lane
(74) Attorney, Agent, or Firm—Blakely, Sokoloff, Taylor & Zafman LLP

(57) ABSTRACT

A system is described for servicing a full cache line in response to a partial cache line request. The system includes a storage to store at least one cache line, a hit/miss detector, and a data mover. The hit/miss detector receives a partial cache line read request from a requesting agent and dispatches a fetch request to a memory device to fetch a full cache line data that contains data requested in the partial cache line read request from the requesting agent. The data mover loads the storage with the full cache line data returned from the memory device and forwards a portion of the full cache line data requested by the requesting agent. If data specified in a subsequent partial cache line request from the requesting agent is contained within the full cache line data specified in the previously dispatched fetch request, the hit/miss detector will send a command to the data mover to forward another portion of the full cache line data stored in the storage to the requesting agent. In one embodiment, the system also includes a write combining logic to combine two or more consecutive write requests that meet defined conditions into a single write request.

22 Claims, 5 Drawing Sheets

| CASE | TYPE OF REQUEST | HIT/MISS | PREFETCH CONDITION | READ REQUEST TO MAIN MEMORY | ENQUEUE AN ENTRY INTO COMMAND QUEUE | SET/CLEAR DATA VALID FLAGS |
|---|---|---|---|---|---|---|
| 1 | READ | MISS | - | DISPATCH (64 BYTE) FETCH REQUEST | MISS (01) | CLEAR VALID FLAG(S) FOR CORRESPONDING 16 BYTE SEGMENT(S) CONSUMED BY THE CURRENT REQUEST AND SET THE REMAINING FLAG(S) |
| 2 | READ | HIT | FALSE(0) | - | HIT (10) | CLEAR VALID FLAG(S) FOR CORRESPONDING 16 BYTE SEGMENT(S) CONSUMED BY THE CURRENT REQUEST |
| 3 | READ | HIT | TRUE(1) | DISPATCH (64 BYTE) PREFETCH REQUEST | HIT-PRF(11) | SET ALL DATA VALID FLAG |
| 4 | WRITE | MISS | - | - | - | - |
| 5 | WRITE | HIT | - | - | - | CLEAR ALL DATA VALID FLAGS |
| 6 | EXTERNAL INVALIDATION | - | - | - | - | CLEAR ALL DATA VALID FLAGS |

FIG. 3

| CASE | PREFETCH PENDING FLAG | OLDEST ENTRY IN COMMAND QUEUE | DATA FROM MAIN MEMORY | SERVICE DATA FROM CACHE LINE STORAGE | CHANGE TO PREFETCH PENDING FLAG |
|---|---|---|---|---|---|
| 1 | 0 | EMPTY | - | - | NO CHANGE |
| 2 | 0 | MISS(01) | ACCEPT 64 BYTE DATA | SERVICE 16 BYTE SEGMENT(S) REQUESTED | NO CHANGE |
| 3 | 0 | HIT(10) | - | SERVICE 16 BYTE SEGMENT(S) REQUESTED | NO CHANGE |
| 4 | 0 | HIT-PRF(11) | - | SERVICE 16 BYTE SEGMENT(S) REQUESTED | 0→1 |
| 5 | 1 | EMPTY | ACCEPT 64 BYTE DATA | - | 1→0 |
| 6 | 1 | MISS(01) | ACCEPT 64 BYTE DATA AND DISCARD IT IMMEDIATELY ACCEPT THE SUBSEQUENT 64 BYTE DATA | SERVICE 16 BYTE SEGMENT(S) REQUESTED | 1→0 |
| 7 | 1 | HIT(10) | ACCEPT 64 BYTE DATA | SERVICE 16 BYTE SEGMENT(S) REQUESTED | 1→0 |
| 8 | 1 | HIT-PRF(11) | ACCEPT 64 BYTE DATA | SERVICE 16 BYTE SEGMENT(S) REQUESTED | NO CHANGE |

METHOD AND SYSTEM FOR SERVICING CACHE LINE IN RESPONSE TO PARTIAL CACHE LINE REQUEST

BACKGROUND OF THE INVENTION

1. Field of the Invention

The present invention generally relates to computer systems, and in particular, to a method and a corresponding system for servicing memory access requests.

2. Description of the Related Art

In computer systems, instructions and data required by a requesting agent (e.g., processor or an input/output (I/O) device) may be retrieved from a main memory or other storage device. However, the latency involved with retrieving information from the main memory can impose a burden on system performance. To improve system performance, prefetching techniques may be implemented to prefetch instructions/data into a faster memory device prior to the time the instruction/data is requested by the requesting agent. In some implementations, the faster memory device may be located external to the requesting agent so that the faster memory device can be loaded without effecting the bandwidth of a bus coupling the requesting agent to the rest of the computer system.

Typically, processors are configured to implement cache line size transfers. Due to demand for faster and more powerful computer systems, processors capable of supporting a larger cache line size are being developed and produced. For example, some conventional processors are configured to support 32-byte cache lines, while some recently developed processors are capable of supporting 64-byte cache lines. Components of a computer system such as I/O devices may be configured to support a certain cache line size.

Situations may arise in which the cache line size supported by a computer component is different from the cache line size supported by a processor, resulting in a cache line size mismatch. For example, a computer component (e.g., I/O controller, I/O devices) may be configured to implement a certain cache line size transfer (e.g., 32 bytes), perhaps, because it was developed for use with a processor supporting a 32 byte cache line scheme. If such component is coupled to a processor utilizing a larger cache line size (e.g, 64 bytes), partial cache line memory requests (e.g., 32 byte data request) from such component may result in additional snoop requests occurring on the processor bus due to mismatch in cache line sizes, wasting the processor bus bandwidth and reducing overall system performance.

BRIEF DESCRIPTION OF THE DRAWINGS

FIG. 3 is a table illustrating operations of a hit/miss detection logic according to one embodiment of the invention.

FIG. 4 is a table illustrating operations of a data mover logic according to one embodiment of the invention.

DETAILED DESCRIPTION OF THE INVENTION

Implementations of the present invention are described herein for purposes of illustration, namely a method and a corresponding system for servicing an entire cache line in response to a partial cache line request.

Figure 1:
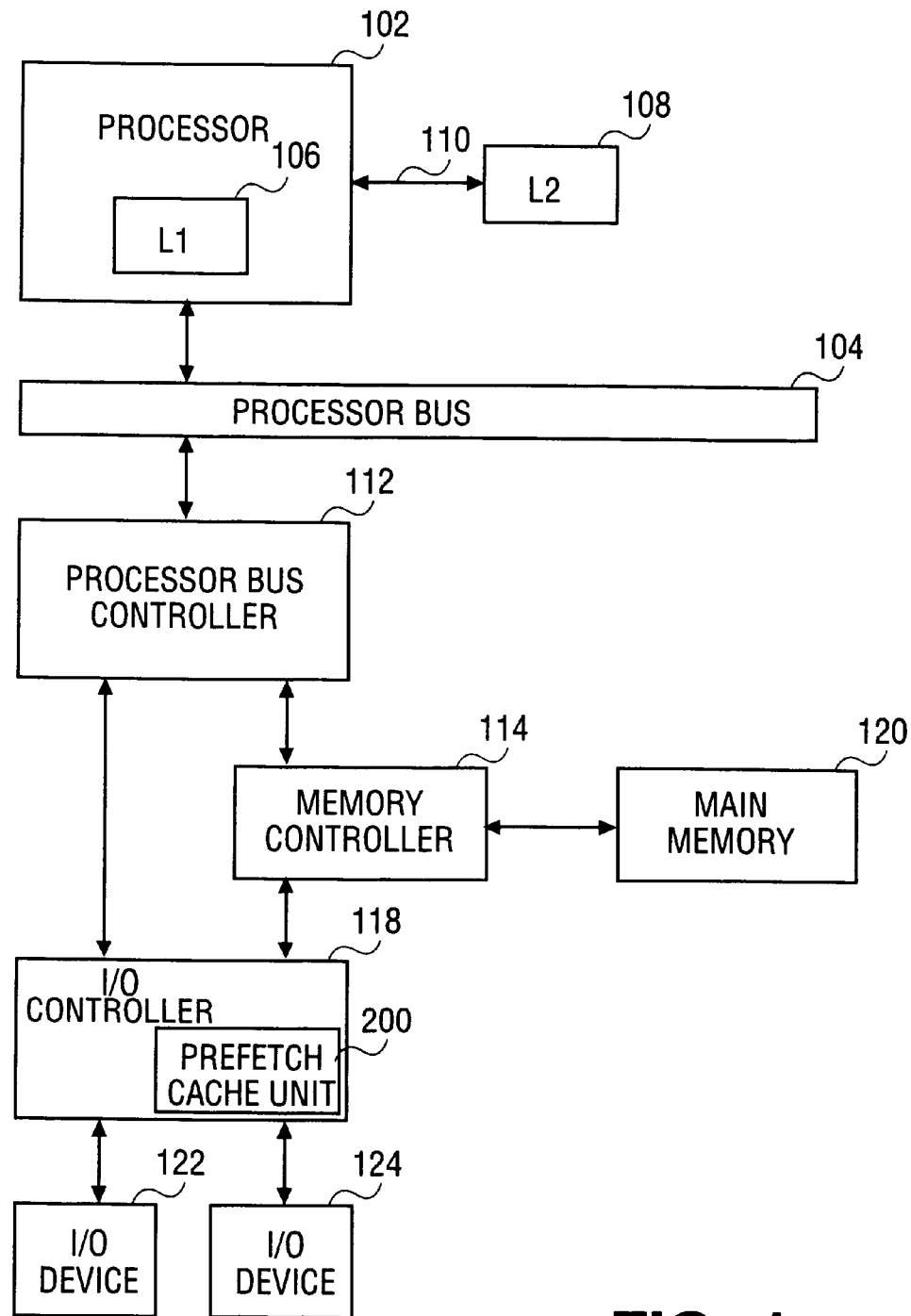
FIG. 1 is a block diagram of one embodiment of a computer system suitable for use with the present invention.

FIG. 1 depicts one embodiment of a computer system in which the present invention may be implemented. The computer system includes a processor 102 coupled a processor bus 104. In one embodiment, the processor 102 is a processor from the Pentium® family of processors including the Pentium®, Pentium® Pro, Pentium® II and Pentium® III processors available from Intel Corporation of Santa Clara, Calif. Alternatively, other processors may be used. The processor may include a first level (L1) cache memory 106. In one embodiment, the processor 102 is also coupled to a cache memory, which is a second level (L2) cache memory 108, via a dedicated cache bus 110. The L1 and L2 cache memories can also be integrated into a single device. Alternatively, the cache memory may be coupled to each processor by a shared bus.

A processor bus controller 112 is coupled to the processor bus 104. In the illustrated embodiment, a main memory 120 is coupled to the processor bus controller 112 via a memory controller 114. The memory controller 114 coordinates data transfer to and from the main memory 120 at the request of the processor 102 and I/O devices 122, 124. The main memory 120 and the cache memories 106, 108 store sequences of instructions and data that are executed by the processor 102. In one embodiment, the main memory 120 includes a dynamic random access memory (DRAM); however, the main memory may have other configurations. Additional devices may also be coupled to the memory controller 114, such as multiple main memory devices. I/O devices 122, 124 are coupled to the processor bus controller 112 and the memory controller 114 via an I/O controller 118. Data and/or sequences of instructions executed by the processor 102 may be retrieved from the main memory 120, the cache memories 106, 108, or any other storage device. The computer system is described in terms of a single processor; however, multiple processors can be coupled to the processor bus. Alternatively, in a multiple processor computer system, each processor may have a direct connection with the processor bus controller 112 or the memory controller 114.

The processor 102 is configured to implement cache line size transfers, for example; to transfer 64 bytes from a source to a destination. In one implementation, a requesting agent (e.g., I/O device) is configured to support a different cache line size, for example, to transfer in 32 byte increments. In one implementation, a prefetch cache unit 200 is incorporated into the I/O controller 118 to accommodate cache line size mismatches between the processor 102 and the I/O devices 122 and 124.

Figure 2:
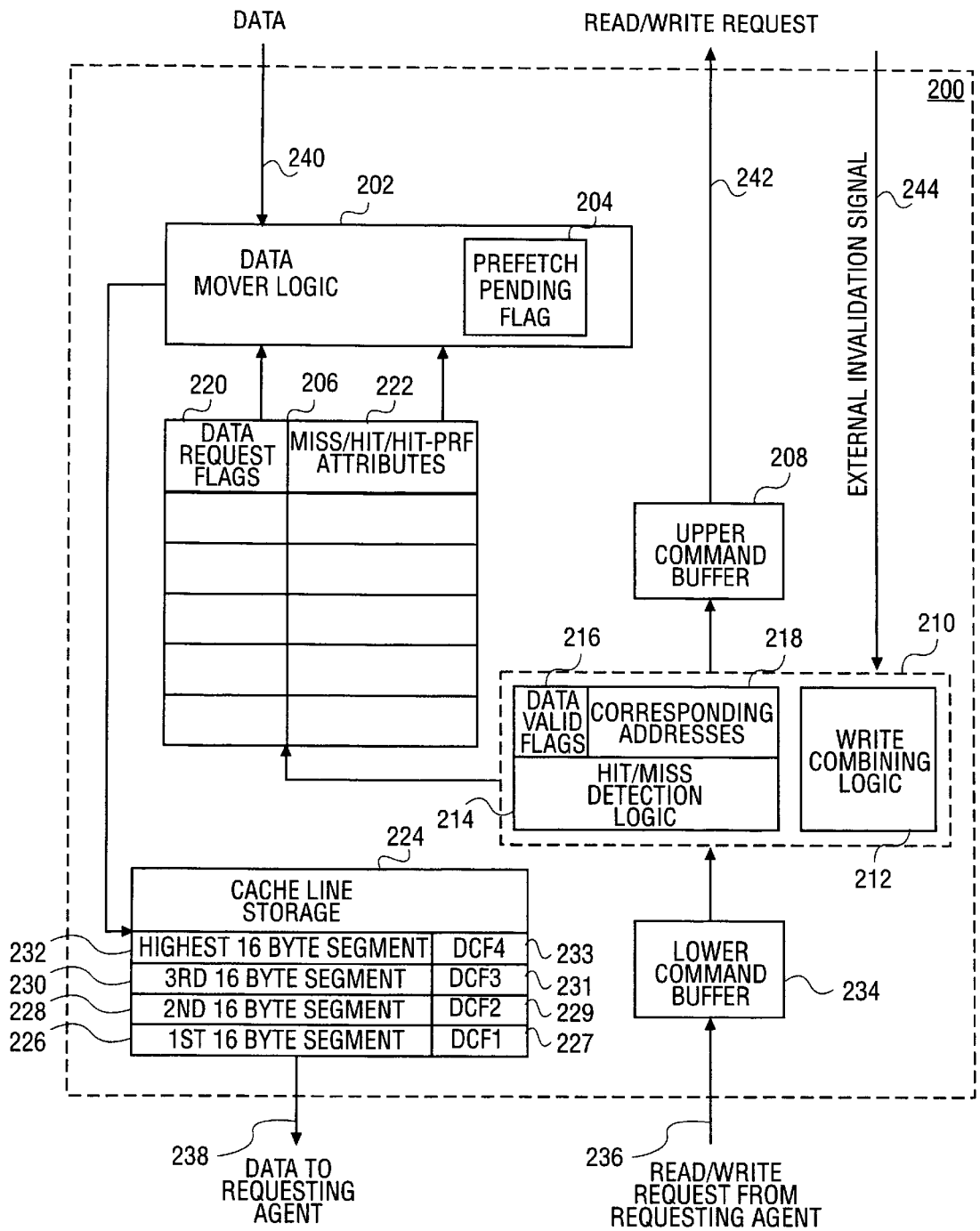
FIG. 2 is a block diagram of a prefetch cache unit according to one embodiment of the invention.

FIG. 2 depicts a prefetch cache unit 200 according to one embodiment of the invention. The prefetch cache unit 200 is configured to accommodate partial cache line requests from a requesting agent (e.g., I/O devices) to effectively utilize the entire cache line size of the processor 102. The prefetch cache unit 200 generally includes a data mover logic 202, a hit/miss detection logic 214, a writing combining logic 212, a cache line storage 224 and a command queue 206.

The cache line storage 224 includes a memory storage 224 configured to store at least one full cache line of data (e.g., 64 bytes). In the illustrated embodiment, the storage 224 is addressed by a 64 byte aligned address and is partitioned into four 16-byte segments 226, 228, 230 and 232. It should be noted that the storage 224 may be partitioned into different number of segments (e.g., 2, 8, etc). There are 4 state bits referred to as data consumed flags, DCF1–DCF4, 227, 229, 231 and 233, where each consumed flag represents one of the four 16-byte data segments. Once the cache line storage 224 is loaded with data, all data consumed flags are cleared to indicate that none of the 16-byte data segments has been consumed by the requesting agent. Once the requested data has been forwarded to the requesting agent, corresponding data consumed flag(s) is set to indicate that the associated 16-byte segment(s) has been consumed.

When a read request is issued by a requesting agent, the request is forwarded to the memory access controller 210. The memory access controller 210 includes a hit/miss detection logic 214 to determine if data specified in a read request from the requesting agent is stored or will be stored in the cache line storage. The hit/miss detection logic 214 is configured to receive a partial cache line read request from the requesting agent. In certain instances, the hit/miss detection logic 214 will dispatch a fetch request to the main memory to fetch a full cache line data that contains data requested in the partial cache line read request from the requesting agent. Then, based on a command received from the hit/miss detection logic 214, the data mover logic 202 may load the cache line storage 224 with the full cache line data returned from the main memory and forward a portion of the full cache line data requested by the requesting agent from the cache line storage. If data specified in a subsequent partial cache line request from the requesting agent is contained with the full cache line data specified in the fetch request previously dispatched by the hit/miss detection logic, the hit/miss detection logic 214 will send a command to the data mover logic to forward the requested data from the cache line storage 224 to the requesting agent.

The full cache line data specified in a fetch request dispatched by the hit/miss detection logic is partitioned into a number of segments. Each segment is associated with a memory address and a data valid flag. In one implementation, there are four data valid flags. Each data valid flag 216 represents one of four 16-byte data segments of a full cache line data and is associated with a memory address 218 which specifies the memory address location corresponding to the data segment. The data valid flags are validated upon dispatching of a fetch request to fetch a full cache line data from the main memory. The hit/miss detection logic is configured to invalidate data valid flag(s) that are associated with those data segments that matches a memory address specified in a subsequent read request from the requesting agent.

In this regard, by accessing the data valid flags 216 and their corresponding addresses 218, the hit/miss detection logic 214 is able to determine if a read request from the requesting agent hits one of more of the segments contained in a full cache line fetch request dispatched by the hit/miss detection logic 214. An incoming read request is considered a hit to the full cache line fetch request if the memory address specified in the read request from the requesting agent matches that of the addresses 218 of the 16 byte segments associated with the full cache line fetch request and the valid flags 216 of the requested 16 byte segments are valid. Otherwise, the read request is considered a miss.

A read miss means that either the address does not match or the valid flag is invalid. If the read request from a requesting agent results in a miss, the hit/miss detection logic 214 will dispatch a fetch request to fetch a full cache line that contains the requested data, rather than only a portion of the cache line requested by the requesting agent. At the same time, the hit/miss detection logic 214 will place a command (or coded instruction) into the command queue 206. When the requested data is returned from the main memory 120, the data mover logic 202 will load the data into the cache line storage and service the data based on the command received from the command queue 206.

The hit/miss detection logic 214 is also configured to dispatch a prefetch request to the main memory if a read request hits the most significant 16-byte segment 232 of the full cache line specified in the fetch request dispatched by the hit/miss detection logic 214, which will be discussed in more detail with reference to FIG. 3

The command queue 206 contains a number of entries, where each entry holds an attribute 222 and data request flags 220. For every read request processed by the hit/miss detection logic 214, data request flags 220 and an attribute 222 are loaded into one of the entries in the command queue 206. The data request flags 220 are used to specify which 16-byte segment(s) of a full cache line data were requested in a read request. Each attribute 222 indicates one of three possible conditions, namely a miss, a hit or a hit-prefetch, used to guide the data mover logic 202 on how the data in the cache line storage needs to be serviced. In this regard, the data mover logic 202 examines the oldest entry in command queue 206 and a prefetch pending flag 204. Specific actions to be taken by the data mover logic 202 depend on whether the prefetch pending flag 204 is set high or low and the state of the attribute 222.

In operation, when a requesting agent requests for a partial cache line (e.g., 16 bytes, 32 bytes), the hit/miss detection logic 214 will fetch the full cache line (e.g., 64 bytes) if the incoming read request misses the full cache line specified in the fetch request dispatched by the hit/miss detection logic 214. The data fetch request to the main memory 120 causes a snoop request to be initiated on the processor bus 104 for the entire 64 byte cache line during memory accesses to the main memory to ensure that data coherency is maintained. When the data is returned from the main memory 120, the data mover logic 202 will load the data in the cache line storage 224 and return only a portion of the cache line requested by the requesting agent. If the requesting agent issues another read request for another portion of the same full cache line requested by the hit/miss detection logic 214, the requested data is returned to the agent from the same cache line without having to initiate another snoop request on the processor bus 104. By allowing the entire cache line to be transferred from the main memory 120 into the cache line storage 224, the prefetch cache unit 200 effectively reduces the number of snoop requests on the processor bus 104 and latency of read requests.

The prefetch cache unit 200 in accordance with the present invention provides a number of advantages. According to the invention, the effective utilization of a bus bandwidth (e.g., processor bus) is improved by reducing the number of memory accesses and snoop request transactions. Moreover, the latency associated with a sequential stream of read requests is reduced which also results in increase of bus bandwidth. The present invention enables reuse of previous generation computer components that are optimized for previous cache line size (e.g., 32 byte cache line) to be used in a system optimized for a larger cache line size (e.g., 64 byte cache line) without any significant performance degradation.

The prefetch cache unit 200 in accordance with the present invention may be utilized in various applications. For example, the prefetch cache unit 200 can be used to interface two components that were designed for different cache line sizes. When a cache line size mismatch exists between components of the computer system, the prefetch cache unit 200 enable legacy units to work with new component by converting one cache line size request to another cache line size request. While the illustrated embodiment is described in terms of 32 and 64 byte cache line sizes, it should be noted that the prefetch cache unit of the present invention could be modified to accommodate different cache line size mismatches.

FIG. 3 is a table illustrating operations of the hit/miss detection logic 214 according to one embodiment of the invention. In the illustrated embodiment, there are six cases that affect the operations of the hit/miss detection logic 214. In case 1, a memory access request from a requesting agent is a read request and the address specified in the incoming read request does not match any of the data segment addresses associated with the full cache line requested by the hit/miss detection logic. When the requesting agent issues a read request, the address specified in the read request is compared against the addresses 218 and the data valid flags 216 maintained by the memory access controller 210 to determine if the read request hits or misses the full cache line specified in the fetch request dispatched by the hit/miss detection logic. If the read request misses the cache line storage, the hit/miss detection logic 214 will dispatch a read request to the main memory 120 to fetch the entire cache line (e.g., 64 bytes). A miss entry (MISS attribute) 222 is loaded into the command queue 206 to instruct the data mover logic 202 to accept and load the full cache line data in the cache line storage when the data is returned from the main memory 120. Also loaded into the command queue 206 are data request flags to indicate to specify which 16-byte segment(s) 226–232 was specified in the read request.

In one embodiment, the cache line storage 224 behaves like a one-shot cache in that once a read request hits a 16 byte segment of a full cache line specified in the fetch request dispatched by the hit/miss detection logic, the 16 byte segment becomes invalid. This is accomplished by clearing data valid flag(s) that correspond to 16 byte segment(s) hit by a read request and setting the remaining data valid flag(s). For example, assume that a request comes in for lower 32 bytes of a cache line, and a read request is dispatched to fetch the 64 byte cache line, in this case, the first two data valid flags corresponding to the upper 32 bytes of the cache line are set to indicate that those data are still valid and the last two data valid flags are cleared to indicate that the corresponding data is no longer valid.

In case 2, a read request from a requesting agent hits the full cache line requested by the hit/miss detection logic. This means that the address corresponding with 16 byte segment(s) requested in the incoming read request matches the address associated with the cache line requested by the hit/miss detection logic. This also means that the data valid flag(s) 216 associated with the data segment(s) of the cache line requested in the incoming read request is valid. In this case, data valid flag(s) associated with 16-byte segment(s) consumed by this incoming read request is invalidated to indicate that the data is no longer valid. A hit entry (HIT attribute) 222 is loaded into the command queue 206 to instruct the data mover logic 202 to service the read request directly from the cache line storage 224. Data request flags are also loaded into the command queue to specify which 16-byte segment(s) was specified in the read request.

In case 3, a prefetch condition is true which means that a read request from a requesting agent is a hit and has requested the most significant 16-byte segment of the cache line requested by the hit/miss detection logic. In one implementation, if a read request hits the highest 16 byte segment 232, a prefetch request is dispatched based on the principle that if a highest 16 byte segment is addressed by the requesting agent, the next sequential address will likely be requested in the near future. In this case, a prefetch request to prefetch next cache line address (e.g., current address plus 64 bytes) is dispatched to the main memory. All data valid flags are set to indicate that all data segments specified in the prefetch request are valid. Additionally, data request flags are loaded into the command queue to indicate which 16-byte segment(s) was specified in the read request. Further, a hit-prefetch entry (HIT-PRF attribute) is loaded into the command queue to instruct the data mover to service 16-byte segment(s) as specified by the data request flags and then to set the prefetch pending flag.

When a write request is received from a requesting agent, the memory access controller will determine if the address specified in the write request corresponds to data segment addresses associated with the cache line requested by the hit/miss detection logic. In case 4, the service request transmitted by a requesting agent is a write request and the address specified in the write request misses the cache line storage. In this case, the write request gets loads into the upper command buffer and no other actions are taken. However, if the address specified in the write request hits the cache line requested by the hit/miss detection logic (case 5), all data valid flags are invalidated to indicate that the cache line storage contains no valid data in order to maintain coherency.

Certain situations may trigger an external invalidation signal to be transmitted to the hit/miss logic to invalidate the cache line data requested by the hit/miss detection logic. In case 6, an external invalidation signal is transmitted by an external unit (e.g., processor) to ensure that data integrity is maintained by invalidating the data in the cache line storage. For example, when one agent (e.g., processor, I/O device) writes to a certain memory location of the main memory which effects cache line storage data, an external invalidation signal is sent to the hit/logic unit to invalid the data that will be sent to the cache line storage.

In one embodiment, when an external invalidation signal is transmitted from an external unit to the memory access controller, the data valid flags are cleared so that subsequent read request to the corresponding addresses would be treated as a read miss. This is to ensure that when a read request from a requesting agent (e.g., I/O device) hit one or more segments of a full cache line fetch request dispatched from the memory access controller, the request data is fetched from the main memory instead of reading from the cache line storage.

FIG. 4 is a table illustrating operations of the data mover logic 202 according to one embodiment of the invention. In the illustrated embodiment, there are eight cases that affect the operations of the data mover logic 202. The data mover logic 202 continually examines the oldest entry in command queue 206 and the prefetch pending flag 204. In case 1, the prefetch pending flag 204 is in logic low state (e.g., zero) and the command queue 206 is empty. In this case, the data mover logic 202 does nothing. In case 2, the prefetch pending flag is zero and the oldest entry in command queue indicates a miss condition (MISS attribute). This means that a read request to fetch a cache line (64 bytes of data) from the main memory has been dispatched. When the data is returned from the memory, the data mover logic will load the entire cache line of data into the cache line storage. Once the data is in the cache line storage, all data consumed flags will be cleared to indicate that none of the 16-byte data segments has been consumed by the requesting agent. Then, the data mover logic will service 16 byte segment(s) requested by the requesting agent based on the data request flags 220 that specifies which 16 byte segment(s) were requested. Then, the data consumed flag(s) corresponding to those segments services will be set to indicate that those segments(s) have been consumed.

In case 3, the prefetch pending flag is zero and the oldest entry in command queue indicates a hit condition (HIT attribute). This means that an incoming read request has hit one or more of the data segments of the full cache line requested by the hit/miss detection logic. In this regard, the data mover logic will service 16-byte segments(s) from the cache line storage based on the data request flags. In case 4, the prefetch pending flag is zero and the oldest entry in command queue indicates a hit prefetch condition (HIT-PRF attribute). This means that the incoming read request has hit the full cache line requested by the hit/miss detection logic and a prefetch condition has been satisfied. Accordingly, 16-byte segment(s) specified in the read request are serviced from the cache line storage and the logical state of the prefetch pending flag will go from low to high to indicate that a prefetch request has been dispatched. In case 5, the prefetch pending flag is one and the command queue is empty. This means that after the prefetch pending flag has been set, no additional read request came in. Hence, the data mover logic will accept 64 byte data from the main memory and load it into the cache line storage and the prefetch pending flag gets cleared to indicate that the prefetch data has been received. At this time, all data consumed flags will be cleared to indicate that none of the 16-byte data segments has been consumed by the requesting agent.

In case 6, the prefetch pending flag is one and the oldest entry in command queue indicates a miss condition (MISS attribute). This means that two separate cache line read requests have been dispatched, one to prefetch data, and the other one to service a read miss. Such situation arises when a read request hits the highest 16-byte segment 232 of the full cache line requested by the hit/miss detector, triggering a prefetch request to be dispatched. Shortly thereafter, a subsequent read request comes in that does not hit the data specified in the prefetch request. In this case, the prefetch data is accepted from the main memory and immediately discarded. The prefetch pending flag gets cleared to indicate that the prefetch data has been received. Then, the following full cache line of data from the main memory is accepted and loaded into the cache line storage. Once the following cache line data is loaded into the cache line storage, the data mover logic will service 16-byte segment(s) as specified by the data request flags.

In case 7, the prefetch pending flag is one and the oldest entry in command queue indicates a hit condition (HIT attribute). Because the prefetch pending flag is set high, the data mover logic will wait to receive the prefetch data and load the data into the cache line storage when it comes in. The HIT attribute indicates that there was a hit to the prefetch request. Hence, once the prefetch data is loaded in the cache line storage, the 16-byte segment(s) specified in the read request is returned to the requesting agent. The prefetch pending flag gets cleared to indicate that the prefetch data has been received.

In case 8, the prefetch pending flag is one and the oldest entry in command queue indicates a hit prefetch condition (HIT-PRF attribute). The prefetch pending flag is set high, causing the data mover logic to wait for the 64 bytes of data corresponding to the prefetch request and load into the cache line storage when it comes in. The HIT-PRF attribute indicates that there was a hit to the highest 16-byte segment of the prefetch request. Hence, once the prefetch data is loaded in the cache line storage, the 16-byte segment(s) specified in the read request is forwarded to the requesting agent. Because there was a hit to the highest 16-byte segment, another prefetch request has been dispatched. Hence, the prefetch pending flag will remain a logic high.

Referring back to FIG. 2, the memory access controller 210 also includes a write combining logic 210 which combines two or more consecutive write requests into a single write request if certain conditions are satisfied. Advantageously, by combining write requests, the number of snoop operations is reduced. When a write request is issued by a requesting agent, it gets loaded in the upper command buffer 208. Then, a subsequent request gets loaded into the lower command buffer 234. If the subsequent request in the lower command buffer 234 is also a write request, the write combining logic 210 examines the write requests in the upper and lower command buffers to determine if they are combinable. If the write requests are combinable, they are combined and loaded in the upper command buffer 208. If a condition for evicting the write request from the upper command buffer 208 is satisfied, the write request will be evicted from the upper command buffer 208.

Figure 5:
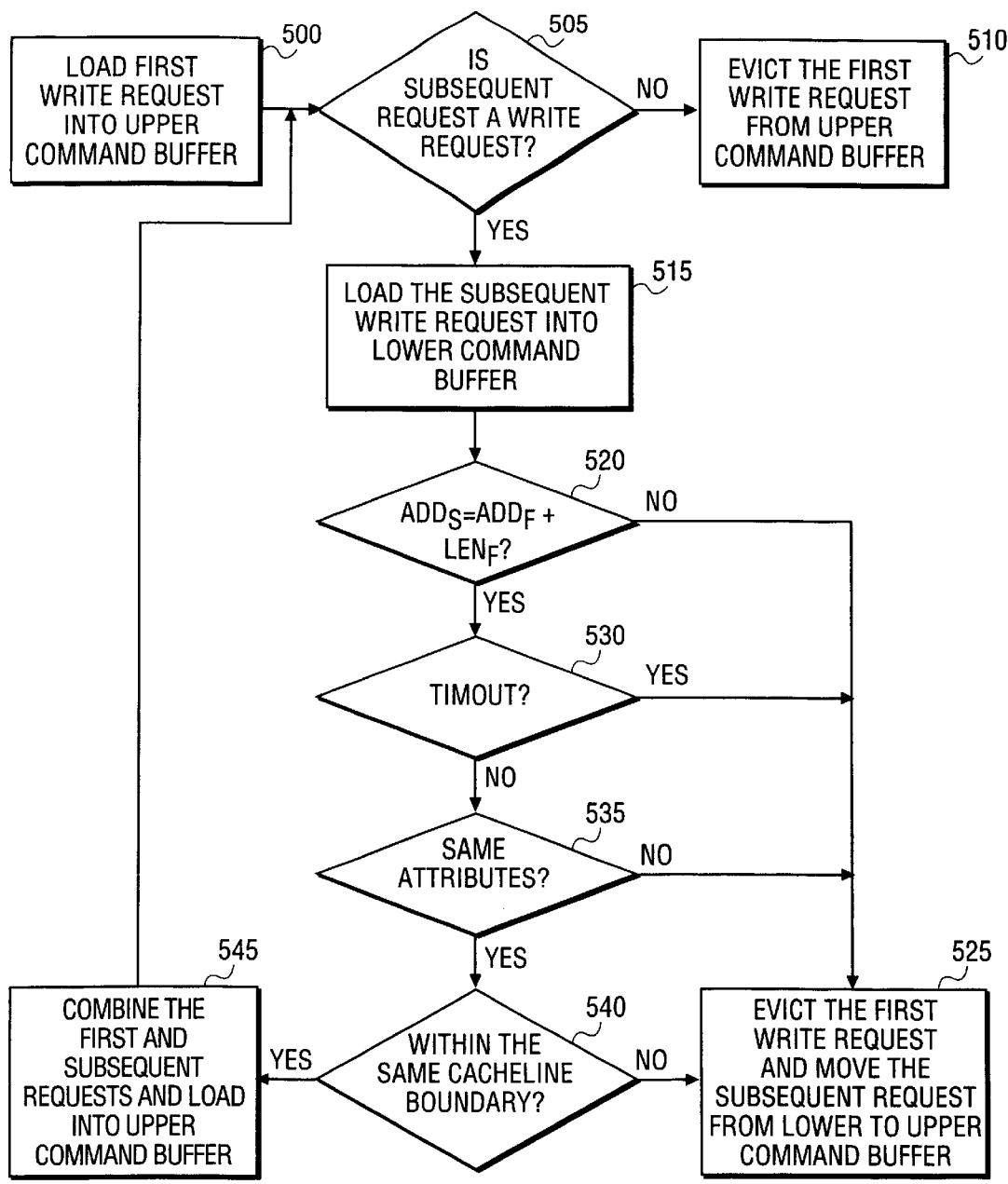
FIG. 5 is a flowchart of operations of a write combining logic according to one embodiment of the invention.

FIG. 5 depicts operations of the write combining logic 210 according to one embodiment of the invention. The write combining logic 210 combines two or more consecutive write requests that meet defined conditions into a single write request. By not requiring each write request to be dispatched individually to the main memory and instead allowing writes to be combined, the overall performance of the system is improved since the number of memory accesses and snoop request transactions are reduced. For example, if a requesting agent is configured to implement partial cache line size transfers, the agent will partition a long write into a partial cache line size (e.g., 32 bytes of data). Consequently, if the write requests are not combined, the number of writes requests and snoop operations will increase significantly. For example, if two 32 byte write requests were combined in the same cache line, the number of write request and snoop request necessary is reduced by a factor of two.

In block 500, a first write request to be written to the main memory is first loaded in the upper command buffer 208 where it is held pending a subsequent write request. The subsequent write request is combined with a previous request if the following conditions hold true. In one implementation, any of the conditions discussed below can be selectively enabled or disabled by any configuration methods such as programmable registers. If the immediately subsequent request is not a write request (block 505, no), the previous write request is evicted from the upper command buffer in order to service the read request (block 510). On the other hand, if the immediately subsequent request is a write request (block 505, yes), the subsequent write request gets loaded into the lower command buffer (block 515).

In one implementation, the first condition requires that only write requests that are consecutive in space can be combined. The address of the new write request must be the next sequential address, which means that if a first write request has a starting address ($add_f$) and a length ($len_f$), the immediately subsequent write request must have a starting address ($add_s$) which is sequential to the first write request. In a decision block 520, the address of the second write request ($add_s$) loaded in the lower command buffer is compared with the address of the first write request loaded in the upper command buffer incremented by the length of the first write request ($add_f+len_f$). If the write requests are not consecutive in space (block 520, no), the first write request is evicted out of the upper command buffer (block 525). Accordingly, write requests to the same address location will not result in write combining since such requests will not be consecutive in space.

The second condition requires that a timeout must not have occurred since acceptance of previous write request in order to combine it with a subsequent write request. In one implementation, each time a write request comes in to the upper command buffer 208, a timer is reset to an initial value (e.g., between 1 to 128 clock cycles) and the timer is decremented until another write request comes in. The moment the timer becomes zero (block 530, yes), the write request in the upper command buffer is evicted (block 525). The initial value of the timer is programmable in order to enable a user to select a timeout value.

The third condition requires that attributes of a subsequent request must be the same as those of a previous write request in order for the writes to be combinable. For example, a bogus attribute may be attached to a write request to indicate a bogus cycle (e.g., write request is addressed to a read only region of the memory). In this regard, if the attributes of the write requests are different (block 535, no), the first write request is evicted from the upper command buffer and the subsequent write request is moved from the lower to upper command buffer (block 525).

The fourth condition requires that the subsequent write request and previous write request must lie within the same cache line boundary. In this regard, if the write requests do not lie within the same cache line boundary (block 540, no), the previous write request is evicted out of the upper command buffer and the new request is moved from the lower command buffer to the upper command buffer (block 525). Otherwise, if all the conditions for write combining are satisfied (block 540, yes), the previous and subsequent write requests are combined and loaded in the upper command buffer (block 545). It should be noted that an incoming combinable write with high priority causes the resulting priority of the write request to be high independent of the original priority.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. An apparatus comprising:
   a storage to store at least one cache line of data;
   a hit/miss detector to receive a partial cache line read request from a requesting agent and dispatch a fetch request to a memory device to fetch a full cache line data that contains data requested in said partial cache line read request from said requesting agent; and
   a data mover to load said storage with said full cache line data returned from said memory device and forward a portion of said full cache line data requested by said requesting agent, wherein said hit/miss detector sends a command to said data mover to forward another portion of said full cache line data stored in said storage to the requesting agent if data specified in a subsequent partial cache line request from said requesting agent is contained within the full cache line data specified in said fetch request dispatched by said hit/miss detector.

2. The apparatus of claim 1, wherein said full cache line data requested by said hit/miss detector is partitioned into a plurality of segments, each segment associated with a memory address and a data valid flag, said data valid flag is validated upon dispatching of a fetch request to fetch a full cache line data from said memory device, and said data valid flag is invalidated if the memory address associated with the segment matches a memory address specified in a subsequent read request from said requesting agent.

3. The apparatus of claim 1, wherein said storage is partitioned into a plurality of segments, each of said plurality of segments associated with a data consumed flag.

4. The apparatus of claim 1, further comprising a command queue having a plurality of entries, wherein each entry holds said command produced by said hit/miss detector.

5. The apparatus of claim 4, wherein said command produced by said hit/miss detection includes data request flags to specify which segment(s) is requested in said read request and an attribute to indicate one of following conditions; miss condition, hit condition or hit-prefetch condition.

6. The apparatus of claim 1, wherein said hit/miss logic dispatches a prefetch request to the memory device if the read request is a hit and requests the most significant segment of the full cache line specified in the fetch request dispatched by the hit/miss detector.

7. The apparatus of claim 1, further comprising a write combining to combine write requests into a single write request if the write requests are consecutive in space and lie within the same cache line boundary.

8. The apparatus of claim 7, wherein said write combining combines write requests into a single write request if the write requests are received prior to expiration of a timeout period.

9. A method comprising:
   receiving a partial cache line request from a requesting agent;
   dispatch a fetch request to a memory device to fetch a full cache line data that contains data requested in said partial cache line request from said requesting agent;
   loading a storage with said full cache line data returned from said memory device;
   forwarding data specified in said partial cache line request from said storage to said requesting agent; and
   servicing a subsequent partial cache line request from said storage if data specified in said subsequent partial cache line request is contained within the full cache line data specified in said fetch request.

10. The method of claim 9, further comprising combining partial cache line write requests into a single write request if said write requests are consecutive in space and lie within the same cache line boundary.

11. The method of claim 9, wherein said storage is partitioned into a plurality of segments, each of said plurality of segments associated with a data consumed flag.

12. The method of claim 11, dispatching a prefetch request to the main memory if the read request hits the most significant segment of the storage.

13. A system comprising:
   a processor coupled to a processor bus;
   a main memory;
   a memory controller coupled between said processor bus and said main memory;
   an I/O device; and
   an I/O controller coupled between said I/O device and said memory controller and said processor bus, wherein said I/O controller includes;

a storage to store at least one cache line of data, a hit/miss detector to receive a partial cache line read request from said I/O device and to determine if data specified in said partial cache line read request is stored or will be stored in said storage, wherein said hit/miss detector dispatches a read request to a main memory to fetch a full cache line that contains the requested data in the event the read request misses said storage, and a data mover to load said storage with data returned from said main memory and to forward at least a portion of the data to the I/O device based on an instruction produced by said hit/miss detector.

14. The system of claim 13, wherein said processor supports a first cache line size and said I/O device is configured to support a second cache line size, wherein said first cache line size is greater than said second cache line size.

15. The system of claim 13, wherein said storage is partitioned into a plurality of segments, each of said plurality of segments associated with a data consumed flag.

16. The system of claim 15, wherein said data consumed flag is cleared upon loading of the corresponding segment with data and said data consumed flag is set once the data is forwarded to the I/O device to indicate that the data associated with the segment has been consumed.

17. The system of claim 13, further comprising a command queue having a plurality of entries, each entry to hold said instruction produced by said hit/miss detector.

18. The system of claim 17, wherein said instruction produced by said hit/miss detection includes data request flags to specify which segment(s) is requested in said read request and an attribute to indicate one of following conditions; miss condition, hit condition or hit-prefetch condition.

19. The system of claim 13, wherein said hit/miss logic dispatches a prefetch request to the main memory if the read request hits the most significant segment of the storage.

20. The system of claim 13, further comprising a write combining to combine write requests into a single write request if the write requests are consecutive in space and lie within the same cache line boundary.

21. The system of claim 20, wherein said write combining combines write requests into a single write request if the write requests are received prior to expiration of a timeout period.

22. The system of claim 20, wherein said write combining combines write requests into a single write request if the write requests have same attributes.

* * * * *